W. ESHELBY.
ANTIBURST TUBE FOR LINING WATER PIPES.
APPLICATION FILED APR. 26, 1918.

1,304,036.

Patented May 20, 1919.

Witnesses:-

Inventor ent is:—

UNITED STATES PATENT OFFICE.

WILLIAM ESHELBY, OF CALGARY, ALBERTA, CANADA.

ANTIBURST-TUBE FOR LINING WATER-PIPES.

1,304,036.  Specification of Letters Patent.  Patented May 20, 1919.

Application filed April 26, 1918. Serial No. 230,991.

*To all whom it may concern:*

Be it known that I, WILLIAM ESHELBY, a subject of King George of Britain, residing at 1606 14th street west, in the city of Calgary, in the Province of Alberta, in the Dominion of Canada, have invented a new and useful Improvement in Antiburst-Tubes for Lining Water-Pipes, of which the following is a specification.

My invention relates to an anti-burst tube for lining water pipes, in which a tube having corrugations extending inward from the surface of the pipes, is placed inside an ordinary pipe, each end of the tube being jointed to the pipe so as to prevent the escape of air from between the corrugations of the tube and the inner surface of the pipe, the said tube being made of a material that is elastic and non-friable, and having corrugations there being a space left outside the tube sufficiently large to allow for an increase in the area of the tube such as would occur when water freezes.

I attain these objects by the device illustrated in the accompanying drawings in which:—

Similar numbers refer to similar parts throughout the several views.

Figure 1:
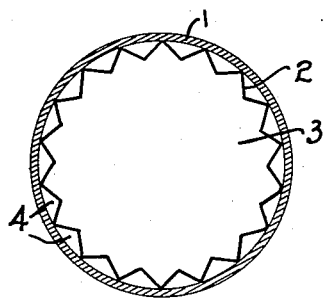
Figure 1, is a cross section through the pipe and tube showing corrugations and air spaces.
Figure 2:
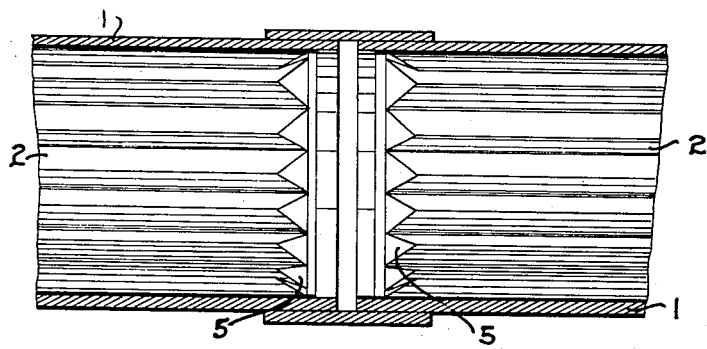
Fig. 2 is a longitudinal section showing the ends of the tube flared out and jointed to the ends of the pipe where a joint occurs.

The pipe, 1, is the usual type of water pipe, and inside this pipe is placed a tube, 2, with corrugations extending inwardly from the inner surface of the pipe. The spaces, 4, between the pipe, 1, and the inner tube are together sufficiently large to allow the full expansion, due to the formation of ice in the pipe, and as the tube, 2, extends the entire length of the pipe and is jointed at 5, to each end, the air space is retained.

When ice is formed in the water channel, 3, pressure is exerted on the corrugated tube, 2, and a bending of the corrugations takes place, which compresses the air between the pipe, 1, and the tube, 2. The corrugations being in a shape substantially as shown, and ice pressure being local, the tube will return substantially to its original shape when the local pressure is removed.

The material of which the anti-burst tube is made is of an elastic and non-friable nature such as copper or brass.

Having thus described my invention, what I claim and desire to secure by Letters Patent is:—

An anti-burst lining tube adapted to be inserted into an ordinary water pipe, said tube being metallic and having longitudinal corrugations, the outer portions of the said corrugations engaging the inner surface of the pipe, the ends of the lining tube being circular and of a diameter equal to the interior diameter of the pipe and being welded or soldered to the inner surface of the pipe whereby to retain an air cushion between the tube and the pipe.

WILLIAM ESHELBY.

Witnesses:
WILFRID J. GRAY,
J. E. BARTLEY.